United States Patent [19]
Kashima

[11] Patent Number: 5,331,566
[45] Date of Patent: Jul. 19, 1994

[54] DIGITIZING APPARATUS WITH EXTENSION-INTERSECTION MEASURING FUNCTION

[75] Inventor: Nobuo Kashima, Niwa, Japan
[73] Assignee: Okuma Corporation, Aichi, Japan
[21] Appl. No.: 789,336
[22] Filed: Nov. 8, 1991

Related U.S. Application Data

[63] Continuation-in-part of Ser. No. 501,138, Mar. 29, 1990, abandoned.

[51] Int. Cl.$^5$ .................. G06F 15/46; G05B 19/42
[52] U.S. Cl. .................. 364/474.29; 364/474.03; 364/474.31; 364/723
[58] Field of Search .................. 364/474.03, 474.15, 364/474.28, 474.29, 474.31, 474.35, 723; 318/573, 578, 568.15

[56] References Cited

U.S. PATENT DOCUMENTS

| | | | |
|---|---|---|---|
| 4,523,287 | 6/1985 | Kogawa | 364/474.35 |
| 4,843,287 | 6/1989 | Taft | 318/573 |
| 4,866,631 | 9/1989 | Kuragano et al. | 364/474.29 |
| 4,952,772 | 8/1990 | Zana | 318/577 |
| 4,965,499 | 10/1990 | Taft et al. | 318/568.11 |
| 5,175,689 | 12/1992 | Matsushita et al. | 364/474.29 |

Primary Examiner—Jerry Smith
Assistant Examiner—Thomas E. Brown
Attorney, Agent, or Firm—Wederoth, Lind & Ponack

[57] ABSTRACT

A digitizing apparatus capable of significantly shortening processing time is arranged to obtain straight portions from measured point-group data and is arranged to obtain the coordinates of intersections of two neighboring straight lines in sequential operations. The digitizing apparatus obtains form data of a subject three-dimensional model by scanning measurement lines on the surface of said three-dimensional model and includes a continuous cycle scanning measuring section for measuring coordinates of points on the measurement lines which are positioned at intervals of constant scanning distances, a measured-coordinate temporary storage section for temporarily storing the coordinates, an extension-intersection calculating section for extracting straight line portions in accordance with the coordinates read from the measured-coordinate temporary storage section and for calculating an extension-intersection as an intersection of two neighboring straight lines, and an extension-intersection storage section for storing the extension-intersection calculated in the extension-intersection calculating section.

3 Claims, 6 Drawing Sheets

```
         TARGET                    ERROR
   X        Y        Z        X       Y       Z      DIS     R 100.000  120.000  80.500   0.000   0.023  -0.005   0.024   OK
100.000  120.000  53.500  -0.001   0.051   0.012   0.052   OK
100.000  180.000  53.500   0.000  -0.009   0.081   0.032   OK
100.000  180.000  20.850   0.001   0.025   0.045   0.051   NG
120.000  120.000  90.500   *****   *****   *****   ****    **
120.000  120.000  63.500   0.002  -0.010  -0.023   0.025   OK
```

FIG. 9

DIGITIZING APPARATUS WITH EXTENSION-INTERSECTION MEASURING FUNCTION

CROSS-REFERENCE TO RELATED APPLICATION

This application is a continuation-in-part of our prior application Ser. No. 501,138, filed on Mar, 29, 1990, entitled "DIGITIZING APPARATUS" and now abandoned.

BACKGROUND OF THE INVENTION

1. Field of the Invention

The present invention relates to a digitizing apparatus with an extension-intersection measuring function for obtaining form data of a three-dimensional model by scanning the surface of the three-dimensional model using a stylus of a tracer head.

2Description of the Prior Art

When the coordinates of a point which does not exist on a three-dimensional model, that is, the coordinates $(X_c, Y_c, Z_c)$ of, for example, a point $P_c$ at $y=Y_c$ on intersection line $L_c$ of planes A and B of a three-dimensional model M shown in FIG. 1 is obtained a conventional digitizing apparatus, the X-coordinate and the Z-coordinate of two optional points $P_{A1}$ and $P_{A2}$ on the plane A at $y=y_c$ and the X-coordinate and the Z-coordinate of two optional points $P_{B1}$ and $P_{B2}$ on the plane B at $y=y_c$ are measured by utilizing a point measuring function. Then, an operator, with a personal computer or the like, obtains straight line $L_A$ passing through the points $P_{A1}$ and $P_{A2}$ and straight line $L_B$ passing through the points $P_{B1}$ and $P_{B2}$ in accordance with the coordinates of each of the points $P_{A1}$, $P_{A2}$, $P_{B1}$ and $P_{B2}$. The coordinates of the intersection (to be called "the extension intersection" hereinafter) becomes the desired coordinates $(X_c, Y_c, Z_c)$ of the point $P_c$.

However, a problem arises in the above-described method for obtaining the coordinates of the extension intersection using the conventional digitizing apparatus in that a tremendous amount labor is required since an operator must effect measurements using the point measuring function or perform calculations using a personal computer or the like.

SUMMARY OF THE INVENTION

In view of the foregoing, an object of the present invention is to provide a digitizing apparatus capable of automatically obtaining the coordinates of an extension intersection in a significantly short time.

According to one aspect of the present invention, for achieving the objects described above, there is provided a digitizing apparatus with extension-intersection measuring function for obtaining form data of a subject three-dimensional model by scanning measurement lines on the surface of said three-dimensional model, said digitizing apparatus comprising: a continuous cycle scanning measuring section for measuring coordinates of points on said measurement lines which are positioned at intervals of certain scanning distances; a measured-coordinate temporary storage section for temporarily storing the coordinates; an extension-intersection calculating section for extracting straight line portions in accordance with the coordinates read from said measured-coordinate temporarily storage section and for calculating an extension-intersection as an intersection of neighboring two straight lines; and an extension-intersection storage section for storing the extension-intersection calculated in said extension-intersection calculating section.

Other and further objects, features and advantages of the invention will be appear more fully from the following description.

BRIEF DESCRIPTION OF THE DRAWINGS

In the accompanying drawings:

FIGS. 8 and 9 are views to explain the operation of the data comparison and collation output section 6, respectively.

DESCRIPTION OF THE PREFERRED EMBODIMENTS

Figure 1:
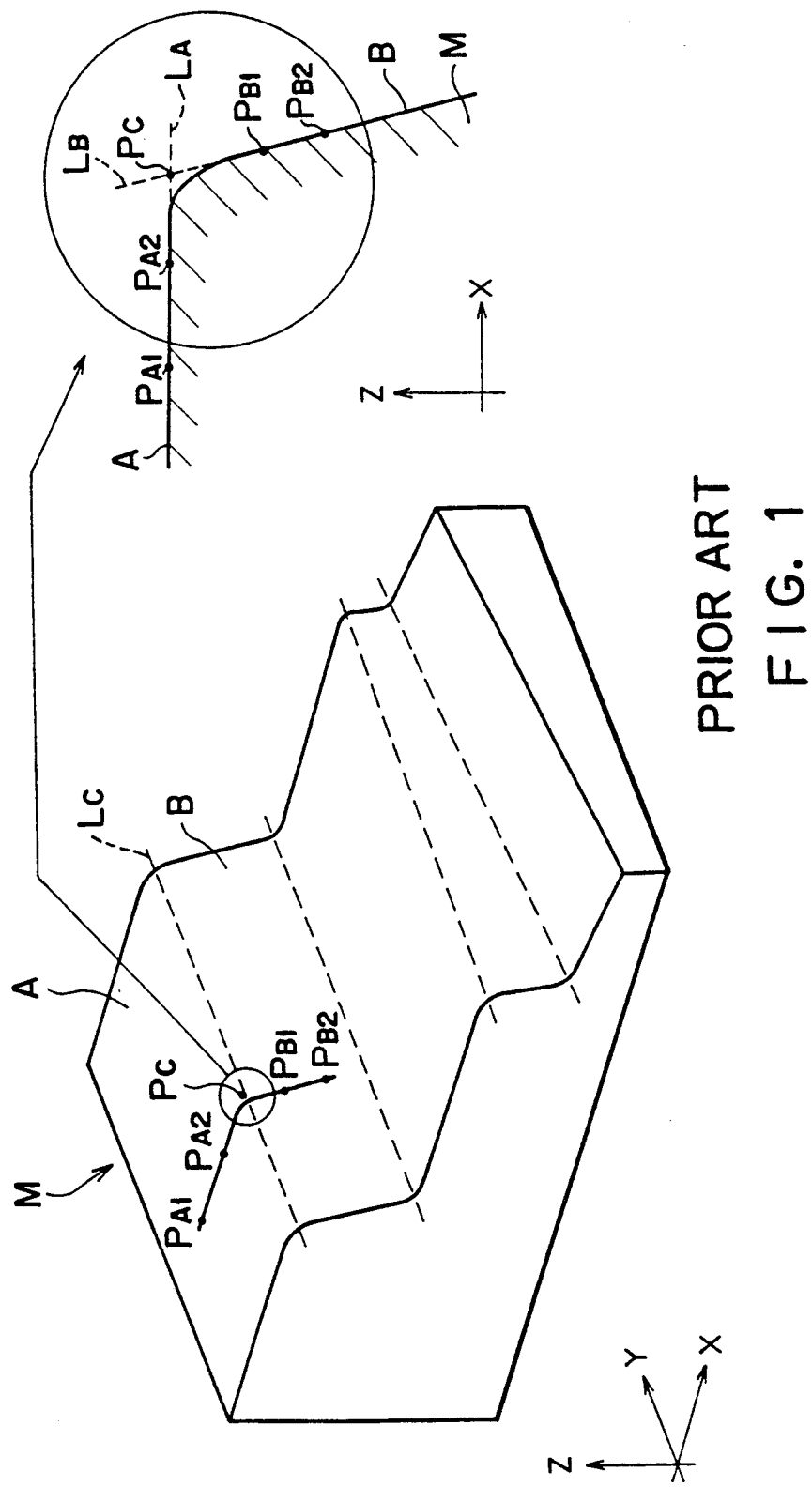
FIG. 1 is a perspective view which illustrates a specific example when extension intersections are obtained by a conventional digitizing apparatus.
Figure 2:
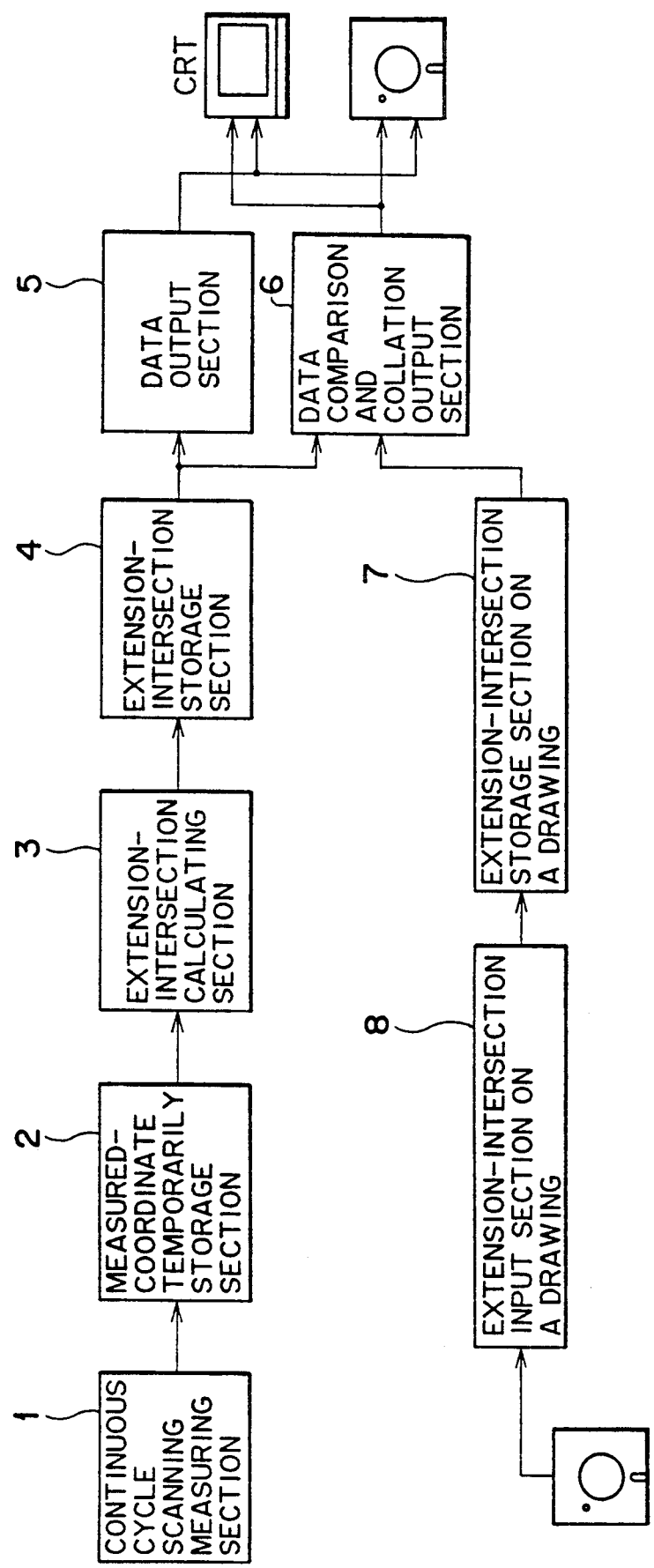
FIG.2 is a block diagram which illustrates an embodiment of a digitizing apparatus according to the present invention.

FIG.2 is a block diagram which illustrates an embodiment of a digitizing apparatus with an extension-intersection measuring function according to the present invention. According to this embodiment, the coordinates of points each of which is positioned at intervals of certain scanning distances on lines to be measured on the surface of a three-dimensional model are measured by a continuous cycle scanning measuring section 1. The thus measured coordinates are then stored as point-group data in a measured-coordinate temporary storage section 2. The coordinates of extension-intersections are calculated by an extension-intersection calculating section 3 in accordance with point-group data read from tile measured-coordinate temporary storage section 2 so as to be stored in an extension-intersection storage section 4 before being transmitted to a CRT or a floppy disk via a data output section 5. Furthermore, a group of the coordinates of extension-intersections on a drawing is supplied from a floppy disk or the like so as to be stored, via an extension-intersections input section 8 for receiving extension-intersections on a drawing, in an extension-intersection storage section 7 for storing extension-intersections on a drawing. The coordinates of the extension-intersections obtained by measurement/calculation and read from the extension-intersection storage section 4 and the coordinates of the extension-intersections on a drawing read from the extension-intersection storage section 7 are subjected to comparison and collation in a data comparison and collation output section 6. As a result, the quantity of error and the result of the collation are obtained so as to be, together with the coordinate of the extension-intersection on a drawing, supplied to a CRT, a floppy disk or the like.

Figure 3:
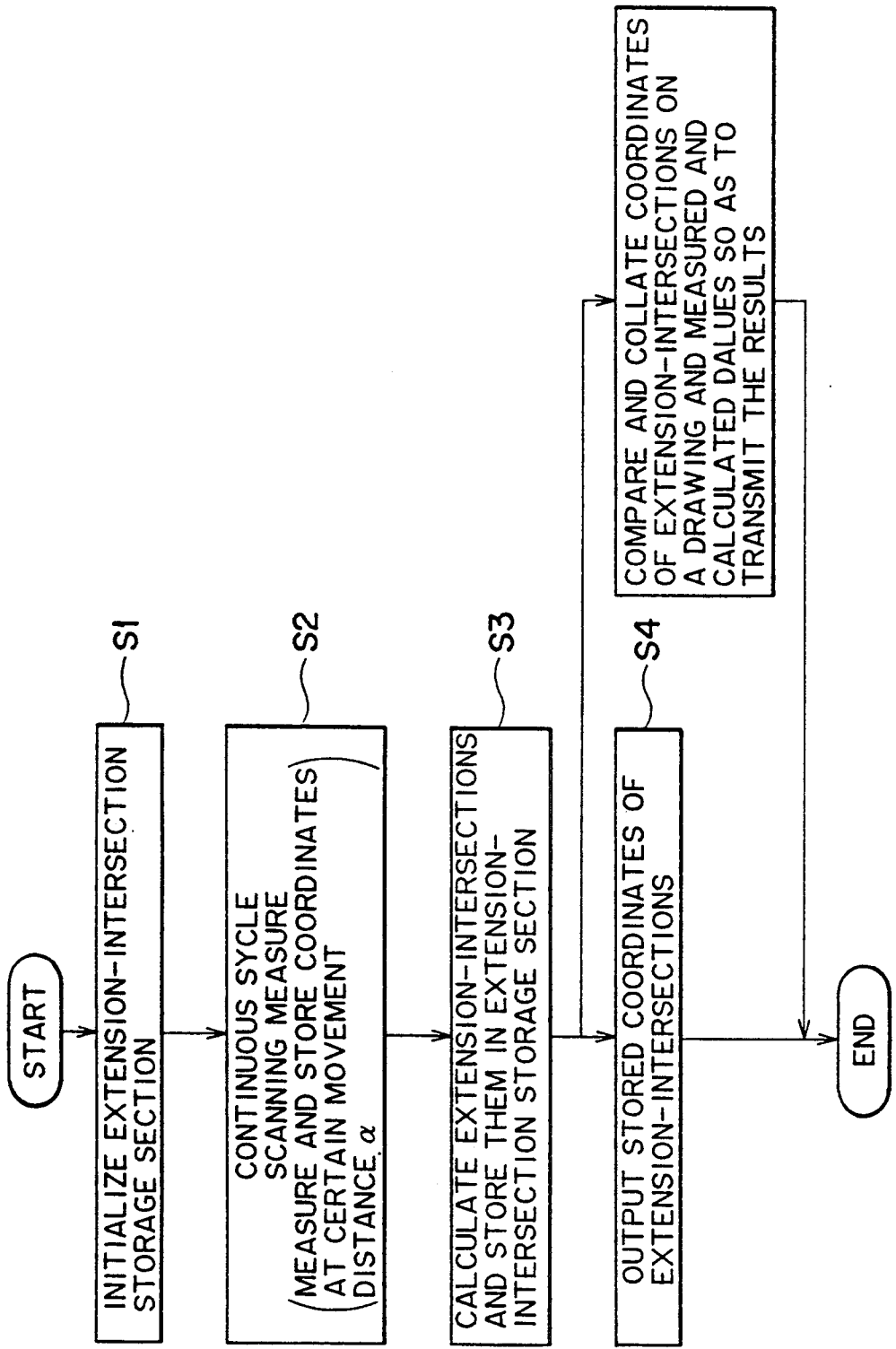
FIG. 3 is a flow chart which illustrates an example of the operation of the apparatus shown in FIG.2.

Referring to a flow chart shown in FIG. 3, an example of the operation of the above-described structure will be described with reference to a case where the following program command has been supplied to a digitizing apparatus:
 IPAC
 TMCP $P_p$, Ll
 IPOUT (or IPCMP)
 MO2

Figure 4:
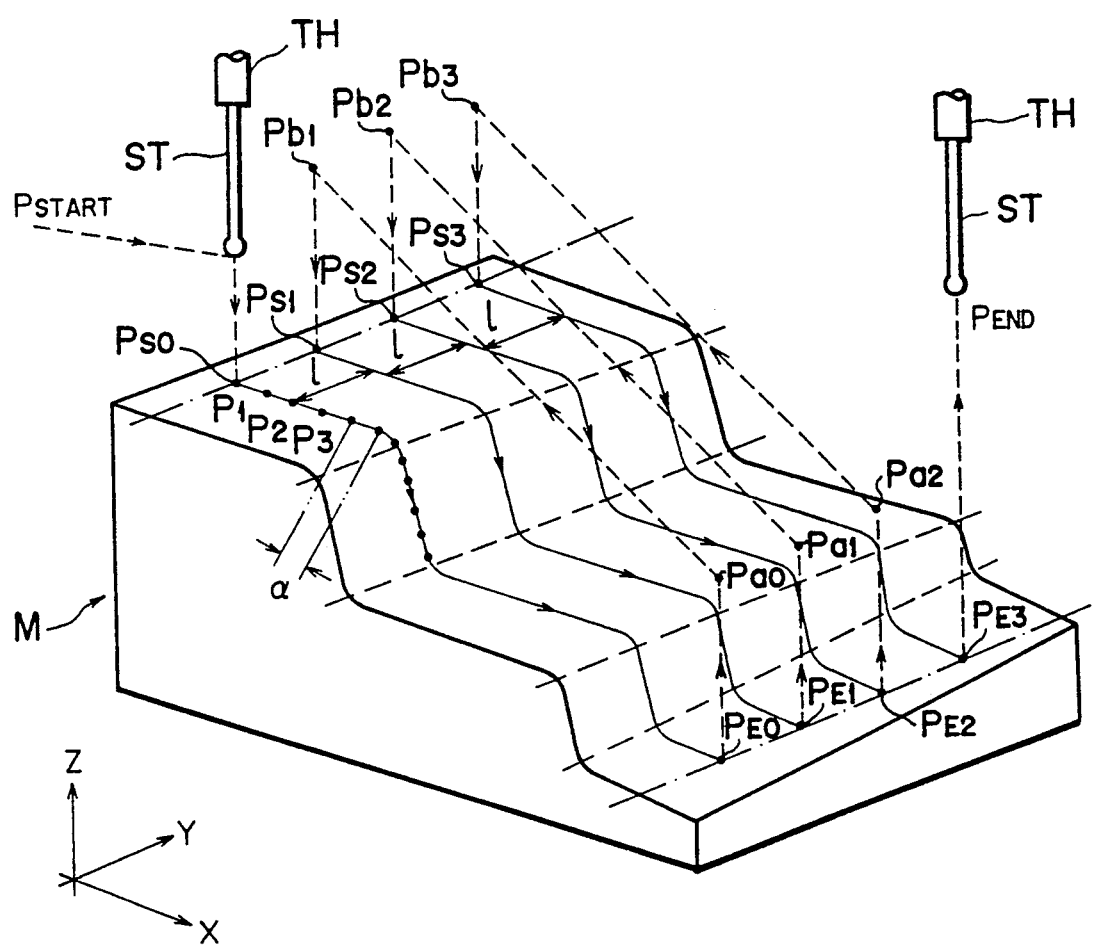
FIGS. 4 and 5 are a perspective view which illustrates a specific operation when the extension intersections are obtained by the digitizing apparatus according to the present invention and a perspective view which illustrates the specific example.

In response to the IPAC-command, the extension-intersection storage section 4 is initialized (Step S1). The continuous cycle scanning measuring section 1 performs continuous cycle scanning measurement of a type, for example, as shown in FIG.4 in response to the TMCP-command (where symbols $P_p$ and Ll respectively represent the storage number of each of parameters when the continuous cycle scanning measurement is executed and the storage area number of each of the scanning limit values). That is, a stylus ST of a tracer head TH is moved from a movement start point $P_{START}$ to a scanning start point $P_{S0}$ on the first measurement line on the surface of a three-dimensional model M so as to scan along the measurement line for the purpose of obtaining the coordinates of the points each of which is positioned at intervals of certain scanning distances. When the stylus ST has reached a scanning end point $P_{E0}$, the stylus ST is retracted from the surface of the three-dimensional model M, and then it is moved, via points $P_{a0}$ $P_{b1}$, to a scanning start point $P_{S1}$ on the next measurement line which is positioned away from the previous measurement line on the three-dimensional model M by pitch l so as to scan this measurement line.

Figure 5:
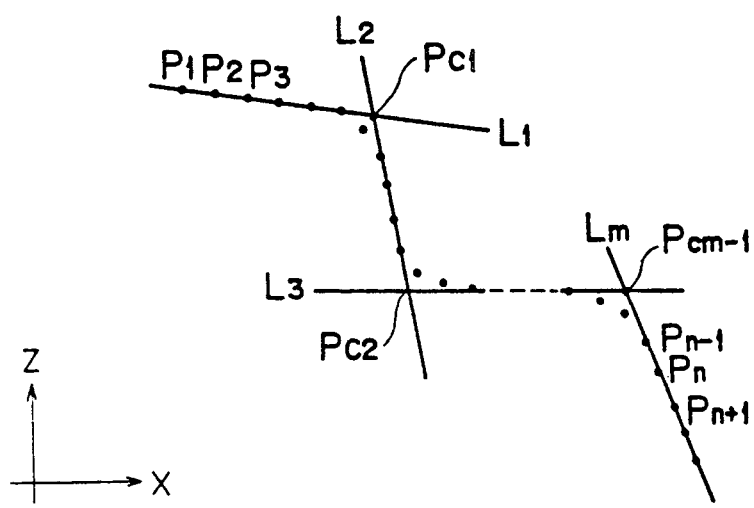

The above-described scanning operation is performed along each of the measurement lines until the stylus ST reaches a scanning end point $P_{E3}$ on the final measurement line. Then, the stylus ST is moved to a movement end point $P_{END}$. The thus obtained coordinates $(X_1,Y_1,Z_1)$, $(X_2, Y_2, Z_2)$, ..., $(X_n, Y_n, Z_n)$, ... of points $P_1$, $P_2$, ..., $P_n$, ... (where symbol n represents an integer) are stored in the measured-coordinate temporary storage section 2 as point-group data (Step S2). The extension-intersection calculating section 3 reads the point-group data from the measured-coordinate temporary storage section 2. Then, the extension-intersection calculating section 3 extracts straight line portions $L_1$, $L_2$, ..., $L_m$ (where symbol m represents an integer) for each measurement line as shown in FIG.5 in accordance with the point-group data which has been read out and in accordance with a previously provided algorithm. Thus, the coordinates $(X_{c1}, Y_{c1}, Z_{c1})$, $(X_{c2}, Y_{c2}, Z_{c2})$, ..., $(X_{cm-1}, Y_{cm-1}, Z_{cm-1})$ of intersections (extension intersections) $P_{c1}$, $P_{c2}$, ..., $P_{cm-1}$ of neighboring two straight lines $L_{i-1}$ and $L_i$ (where $1 \leq i \leq m$) are calculated by the extension-intersection calculating section 3 so as to be stored in the extension-intersection storage section 4 (Step S3). After the operation for calculating the coordinates of the extension-intersections has been completed, the measured-coordinate temporary storage section 2 is initialized.

The operation of the extension-intersection calculating section 3 will be described in detail below.

(1) The extension-intersection calculating section 3 extracts lines satisfying the following two conditions A and B at the same time, in order from the point $P_1$, out of the point-group data ($P_1$ to $P_m$) for each constant distance of one line which are stored in the measured-coordinate temporary storage section 2. Then, the extension-intersection calculating section 3 stores the coordinates of both end points of the line as a line data.

Condition A

Figure 6:
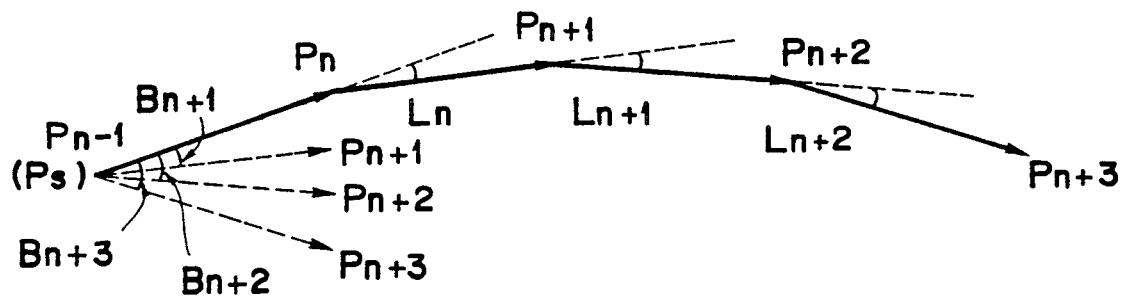
FIGS. 6 and 7 are views to explain the operation of the extension-intersection calculating section 3, respectively.

As shown in FIG. 6, an angle made by a line connecting two adjacent points is assumed as $\alpha_n$ (n:2 to (m−1)), and an angle made between a line connecting a start point $P_s$ ($P_{n-1}$) of the line and a next point thereof and a line connecting the start point $P_s$($P_{n-1}$) of the line and respective points ($P_n$) thereof is assumed as $\beta_n$ (n:2 to (m−1)). The angles are sequentially calculated for the points $P_n$, $P_{n+1}$, $P_{n+2}$, ----. When the calculated angles become not to satisfy the following condition (a) at the same time, a line connected between the point $P_{n-1}$ and the point $P_{n+2}$ (a point before one when the angle become not to satisfy the condition (a)) is determined as a line which satisfies the condition (a). Then, the point $P_{n+2}$ is dealt with as the start point $P_s$ of the next line.

$$\alpha_n < \theta, \alpha_{n+1} < \theta, \alpha_{n+2} < 74, \beta_{n+1} < \theta, \beta_{n+2} < \theta, \beta_{n+3} < \theta \qquad (a)$$

where, $\theta$ is a line extraction judging angle set, in advance as a parameter.

Condition B

If the length L of the line satisfying the above condition A does not satisfy the following the condition (b), the line is abandoned.

$$L > LS \qquad (b)$$

where, LS is a line extraction judging length set in advance as a parameter.

Figure 7:
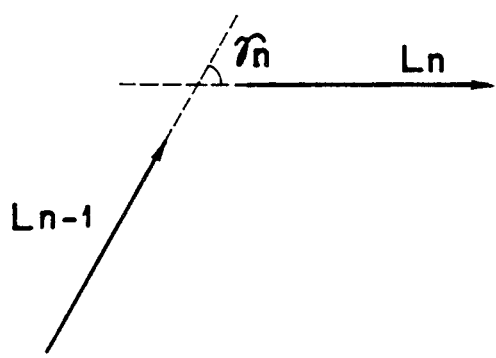

(2) In accordance with the data of the lines $L_n$ ($L_1$ to $L_m$) extracted at the above stage (1), an extension-intersection is calculated in order of the line $L_1$ for two adjacent lines satisfying the following condition (c). That is, as shown in FIG.7, if an angle $\gamma_n$ (n:2 to (m−1)) made between two adjacent lines satisfy the condition (c), the extension-intersection is calculated. On the contrary, if the angle $\gamma_n$ does not satisfy the condition (c), the extension-intersection is not calculated.

$$\gamma_n > \delta \qquad (c)$$

where, $\delta$ is an extension-intersection calculation judging angle set in advance as a parameter.

The data output section 5 reads the coordinates of the extension-intersection from the extension-intersection storage section 4 in response to the next IPOUT-command so as to convert it into a data format which can be transmitted in the form of a list,, the thus formed list being then transmitted to a CRT or a floppy disk (Step S4). Thus, all of the provided operations are ended. In the case where the IPCMP-command has been issued, the data comparison and collation output section 6 makes a comparison and collates the coordinates of the extension-intersections read from the extension-intersection storage section 7 with the coordinates of tile extension-intersections read from the extension-intersection storage section 4. The data comparison and collation output section 6 obtains the quantity of error ($\Delta l$, $\Delta X$, $\Delta Y$, $\Delta Z$) for each of the extension-intersections and the result of the collation so as to convert them into a data format which can be transmitted in the form of a list. The thus formed list is transmitted to a CRT or a floppy disk (Step S5). Thus, all of the provided operations are ended.

The operation of the data comparison and collation output section 6 will be described in detail below.

Figures 8, 9:
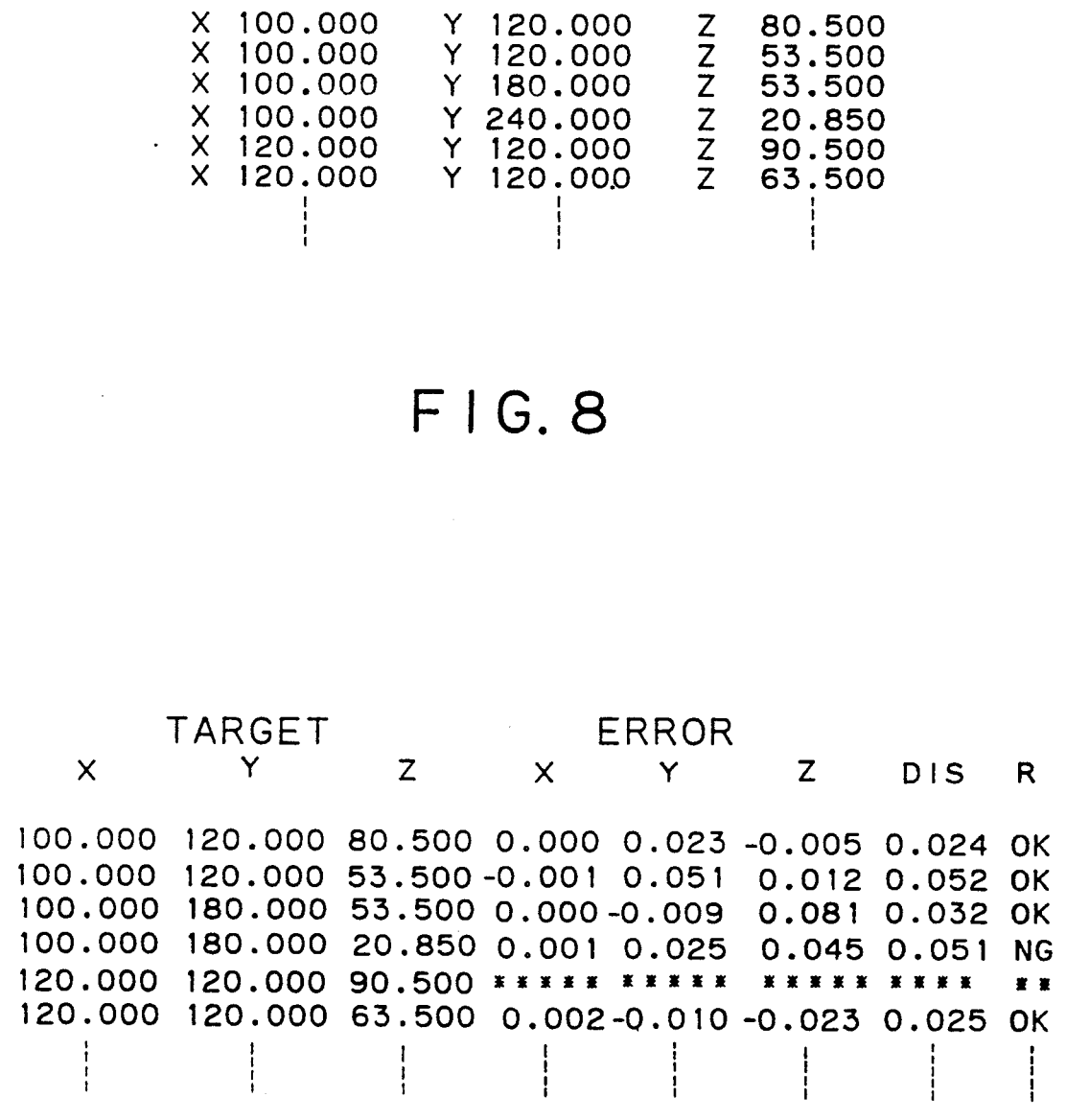

The data comparison and collation output section 6 forms a file as shown in FIG.8 :for corner coordinate value group (hereinafter refer to "extension-intersection coordinate value on a drawing") on a drawing which shows a product made by a metal mold which has been a reference forming a metal mold model of a measurement target, and in advance forms a floppy disk including a collation file filed at the above step and sets in a floppy disk driver (not shown). Then, the extension-intersection input section 8 on a drawing first reads in a file data of the collation file, which is in advance set as parameters, from the above floppy disk in accordance with the IPCMP-command and stores the read file data in the extension-intersection storage section 7 on a drawing. Next, the data comparison and collation output section 6 sequentially reads out the extension-intersection coordinate values from the top of the extension-intersection storage section 7 on a drawing and searches, from the top of the extension-intersection storage section 7, an ex-tension-intersection which satisfies a condition that there is the read coordinate value within a square area 2d×2d (d: a collation target area value set in advance as a parameter) of which a center is the read coordinate value. When the data comparison and collation output section 6 finds out an extension-intersection to first satisfy the condition, it determines that the extension-intersection is a correspondence extension-intersection on a drawing. When the data comparison and collation output section 6 does not find the extension-intersection to satisfy the condition, it outputs "* * * * *" as error marks. The data comparison and collation output section 6 compares the extension-intersection on a drawing with the correspondence extension-intersection, calculates the quantity of error on the respective axial coordinate values and the distance D between the two points and judges that it is "NG" if D>J, or it is "OK" if D≦J. Besides, "J" is a quality judgement value set in advance as a parameter. Finally, the data comparison and collation output section 6 displays tile above comparison and collation results on the CRT by using a data format as shown in FIG. 9 or outputs them to the floppy disk by using an output file name set in advance as a parameter.

The collation results are utilized to inspect the quality of pressed products made by the metal mold. The quantity of error can indicate whether modification of the metal mold is necessary and further is useful to investigate the causes of NG at a time of inspecting the quality of the pressed products. In a case of the drawing on the pressed metal mold products such as inner panel of the automobile, the extension-intersection coordinate value has a very important meaning. On the drawing, there is almost nothing coordinate values except of the extension-intersection coordinate values.

As described above, according to the digitizing apparatus with an extension-intersection measuring function according to the present invention, extension-intersections can be automatically obtained in a short time.

Therefore, time taken from the scanning start to obtaining the coordinates of the extension-intersections can be shortened. Simultaneously, accurate coordinates of extension-intersections can be obtained.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. A digitizing apparatus for obtaining form data of a subject three-dimensional model by scanning measurement lines on the surface of said three-dimensional model using a stylus of a tracer head, said digitizing apparatus comprising:

a continuous cycle scanning measuring section for measuring coordinates of points on said measurement lines which are positioned at intervals of a constant scanning distance of said stylus;

a measured-coordinate temporary storage section for temporarily storing the coordinates of the points on said measurement lines;

an extension-intersection calculating section for determining associated sets of points from among the points on said measurement lines which extend along a same respective straight line in accordance with the coordinates read from said measured-coordinate temporary storage section, for extracting straight lines for the associated sets of points, and for calculating an extension-intersection as an intersection of two neighboring straight lines;

an extension-intersection storage section for storing the extension-intersection calculated in said extension-intersection calculating section; and a data comparison and collation output section for comparing and collating the coordinates of the intersection read from said extension-intersection storage section and previously prepared and stored coordinates of intersections on a drawing so as to output results of said comparison and collation denoting a deviation error between the coordinates of the intersection of the three-dimensional model and the coordinates of intersections on the drawing.

2. A digitizing apparatus with an extension-intersection measuring function according to claim 1, wherein the coordinates of the intersections on the drawing are supplied from a floppy disk.

3. A digitizing apparatus with an extension-intersection measuring function according to claim 1, wherein said comparison and collation output section outputs results of said collation, the coordinates of the intersections and deviation error for display or storage to an external storage device.

* * * * *